Nov. 7, 1967 P. G. K. SCHROEDER 3,350,766
CASING FASTENING MACHINE

Filed Dec. 2, 1965 3 Sheets-Sheet 1

INVENTOR.
PAUL G. K. SCHROEDER
BY
ATTORNEY

INVENTOR.
PAUL G. K. SCHROEDER
BY
ATTORNEY

United States Patent Office 3,350,766
Patented Nov. 7, 1967

3,350,766
CASING FASTENING MACHINE
Paul G. K. Schroeder, 28 Island Trail,
Sparta, N.J. 07871
Filed Dec. 2, 1965, Ser. No. 511,089
5 Claims. (Cl. 29—211)

This invention relates to a fastening machine designed to gather, fasten, and cut sausage casings, bags, and the like. More specifically, it deals with a fastening machine having a powered plunger connected to a driver riding in a channeled arm, designed to accept a fastener to be driven against a crimping die and around a casing compressed in the throat of the machine. Said arm is designed for limited movement, whereby its supporting and aligning end is able to slide under said throat just prior to and during crimping, to support and align the fastener ahead of the crimping die. Other novel features, such as a casing cutter, are also included.

A number of casing fastening machines have been placed on the market in recent years. However, in spite of this, there still has been a need for a light weight uncomplicated unit which, in spite of its simplicity, is able to operate at high capacity with very little maintenance. Present machines involve complex and heavy arrangements due, to a great part, to the difficulty in aligning, guiding, and holding the fastener prior to and during the fastening operation.

According to the present invention, an inexpensive and rugged unit is provided which will practically always align and hold a fastener under such conditions, while still enabling the use of light weight and uncomplicated arrangements for such purpose. Such a machine can be light enough to hold easily in one hand, and yet be able to fasten casings of, say, one inch to twelve inches, or more, in diameter.

Figure 1:
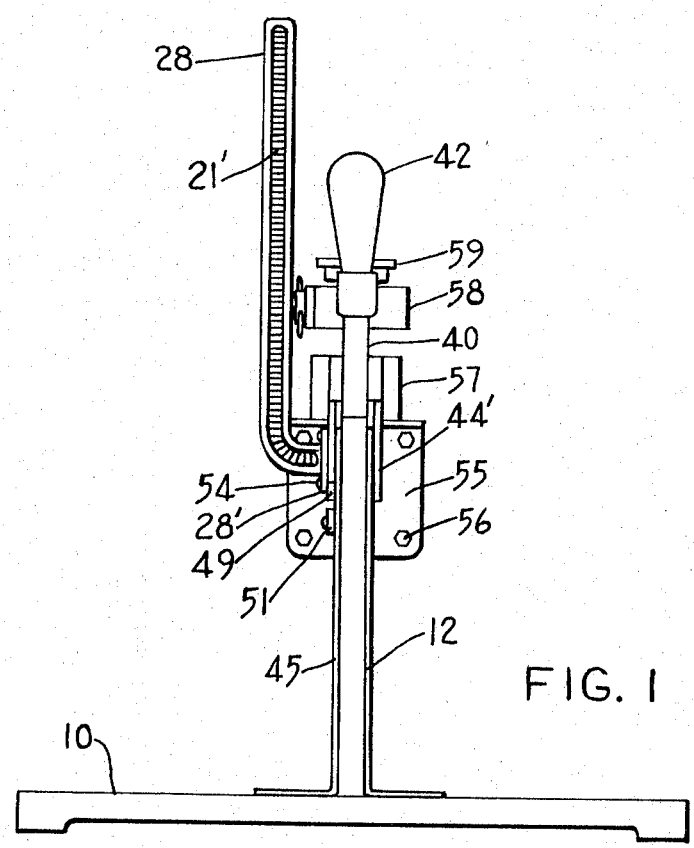
Figure 2:
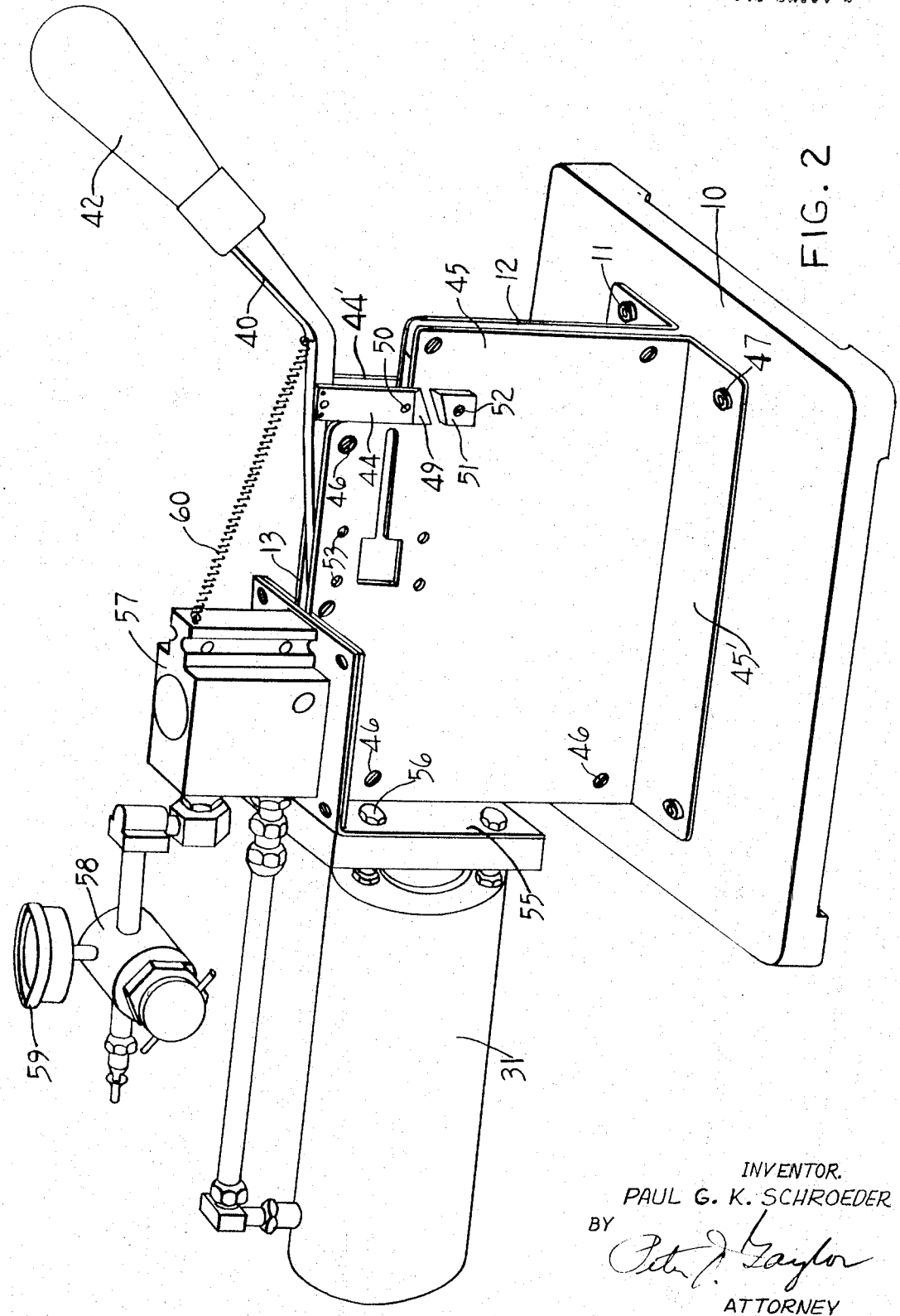
Figure 3:
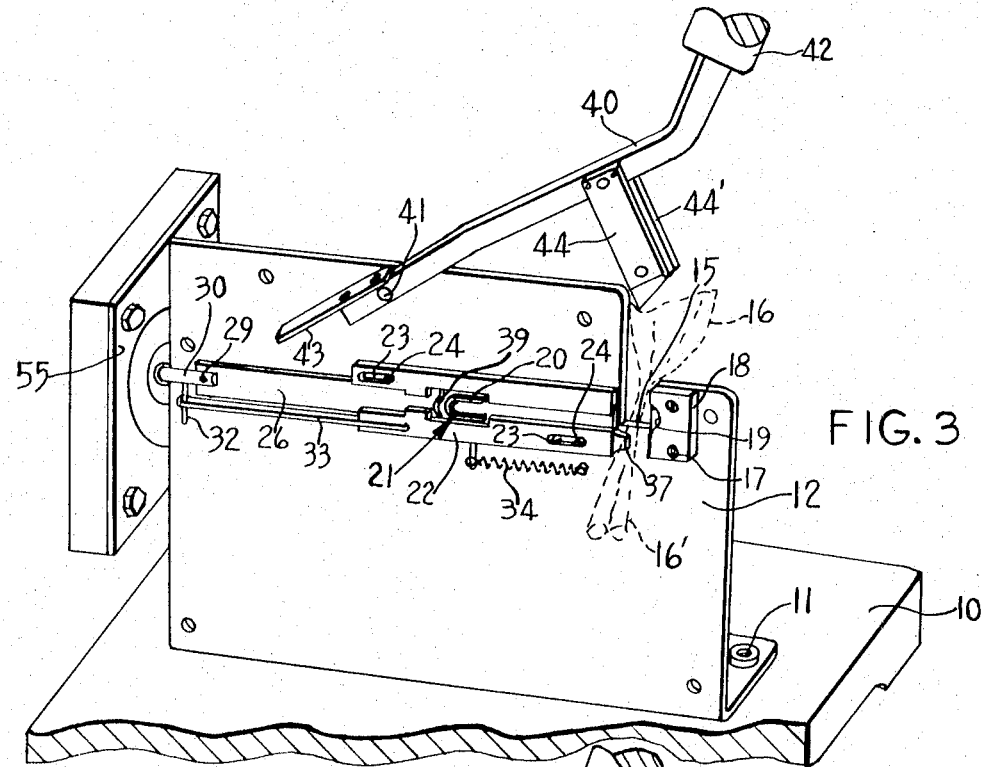
Figure 4:
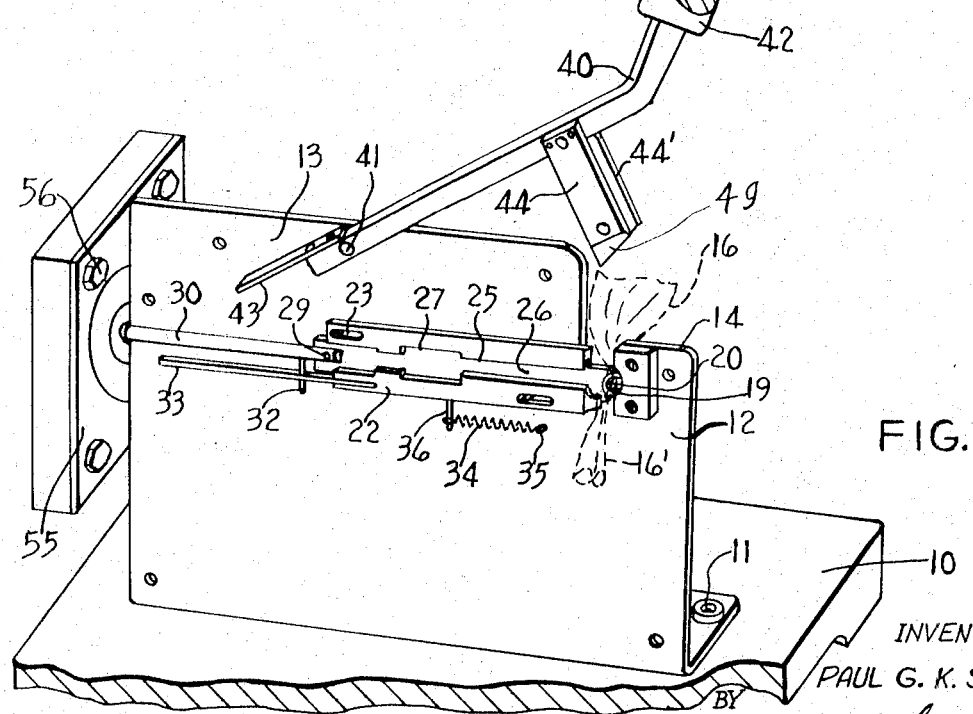

The invention will be more readily understood by reference to the accompanying drawings in which a preferred embodiment is described, and in which FIGURE 1 presents a front elevational view of a fastening machine made in accordance with the present invention. FIGURE 2 illustrates a perspective side elevational view thereof, with the fastener chute removed. FIGURE 3 depicts a similar view, as in FIGURE 2, with the cover plate removed to reveal the driver and sliding guide arm, and with the pressure cylinder and its controls also removed, and portions of the handle and base cut away, the machine being depicted in idle position, while FIGURE 4 shows a similar view as that in FIGURE 3, with the driver at the end of its power stroke.

Referring again to the drawings, numeral 10 indicates a base on which is attached, by screws 11, an upright mounting plate 12. The upper portion of plate 12 has a higher rearward section 13 and a lower forward section 14, between which is disposed a depressed gathering throat 15, in which is gathered the casing end 16–16' to be fastened.

Attached to the inner side of plate 12, adjacent the outer edge of throat 15, and by means of screws 17, is crimping die or anvil 18, having an arcuate recessed die face 19 on which the legs 20 of staple 21 are bent toward each other as the staple is crimped over casing end 16. Oppositely disposed from die 18, and mounted on plate 12 adjacent the inner edge of throat 15, is sliding guide arm 22. The latter arm has slots 23, in which are disposed pins 24 serving as stops. These pins are affixed to plate 12. It is thus seen that guide arm 22 can slide on pins 24 for a short distance, as determined by the length of lateral slots 23. Guide arm 22 slides against the inner wall of plate 12.

Arm 22 has cut into it a laterally-directed channel or similar groove 25 in which slides driver 26. Groove channel 25 is provided with a vertically-widened portion 27, designed so as to enable a staple 21 to slide in sideways from vertical chute 28. Groove 25 is deep enough to almost, but not quite, cover the staple, so as not to engage or interfere with the adjacent staple in the chute during its sliding movement. The rearmost end of driver 26 is attached, at 29, to plunger or piston 30 of air cylinder (motor) 31.

Projecting downwardly from plunger 30 (or driver 26) is pin 32. Attached to the rearward end of guide arm 22 is laterally-and rearwardly-projecting wire loop 33, within which loop rides pin 32. Spring 34 has one end affixed to a pin 35 projecting out of plate 12, and the other end is attached to guide arm projection 36. Projecting from the forward end of guide arm 22 is staple aligning end 37. The latter has a grooved upper edge 38, on which rests the staple 21 just prior to and during the fastening operation. Edge 38 is in alignment with die face 19 so that when the staple is resting on edge 38, the staple is in position to be crimped against die face 19.

Driver 26 has an arcuate groove 39 in its forward end shaped so that the head of staple 21 would fit therein, and thus act as a die. It is driven by plunger 30, and it serves to drive the staple around the gathered casing end 16, and then to exert adequate force so as to crimp the staple against die face 19, so that the casing end is tightly fastened.

Pivoted at 41, near the uppermost edge of the inner side of plate 12, is operating lever 40 having handle 42 on its end. Adjacent the rearmost end of lever 40, and attached to the inner side of plate 12, is the motor valve spring switch 43 which is actuated to turn on the air motor 31 when lever 40 is at the end of its downward stroke.

Pressure plates 44 and 44' are mounted on each side of lever 40 and in alignment with throat 15, so that when lever 40 is forced down, one pressure plate (44) passes along the inner side of plate 12 and the other (44') along the outer side of cover plate 45, and they thus serve to press down the gathered casing end against the bottom throat surface, just prior to passage of the staple around the pressed casing end.

Cover plate 45 is used to cover the main moving parts of the unit, and it is fastened to plate 12 by screws 46. It may also have a lower bent portion 45' which is fastened, by screws 47, to base 10. Cover plate 45 has an opening 48 through which staples are fed into the channel opening 27 of slide arm 22 ahead of driver die 39.

The lower end of pressure plate 44 may be provided with a cut-off knife blade 49, attached thereto by screw 50, to be used to cut off the surplus end 16' of the casing when it lies on anvil 51, which is also attached to plate 45 by screw 52.

Chute 28 is filled with staples 21', which are spring fed in the conventional manner into the machine, as already outline. The lower end of the chute has a plate 28' which is fastened to cover plate 45, provided with threaded holes 53 to take screws 54.

Air motor 31 is attached to cylinder mounting plate 55 by screws 56, plate 55 being attached to plate 12. The motor's accessory equipment, such as the air valve 57, air pressure regulator 58, and pressure gauge 59 are also attached to plate 12. A spring 60 is attached to lever 40 and to air valve 57 to enable return of lever 40 after the completion of its downward stroke.

When in operation, handle 42 first is in its uppermost position, and plunger 30 is withdrawn, as in FIGURE 3, and a staple 21 is present in the channel opening 27 of slide arm 22. A casing end 16 is slipped into throat 15, and handle 42 is pulled down thereon. Pressure plates 44–44' gather and compress the casing end, and knife 49 cuts off the surplus casing. At the same time, switch 43 actuates motor 31, which pushes out plunger 30, to which is attached driver 26. As driver 26 rides in the channel 25 of slide arm 22, pushing staple 21 ahead of it, spring 34 pulls arm 22 so that arm end 37 arrives under throat 15 just before the staple reaches the throat, so that when the staple legs 20 reach die face 19, staple 21 is resting in the accommodating groove in the top of arm edge 37, which latter serves to hold and align the stapple while driver 26 continues to push staple 21 against face 19 until staple legs 20 are crimped around casing end 16, as in FIGURE 4.

Thereafter, handle 42 is raised, thus deactivating switch 43, which causes the spring in motor 31 to draw back plunger 30 and driver 26, and the fastened casing is removed out of the throat. It will be noted that, as plunger 30 retracts, pin 32 enggaes loop 33 attached to slide arm 22, and withdraws the arm to the rest position, as in FIGURE 3.

While the example recited is shown as employing an air motor for moving the driver, it is to be understood than any other motive means may be employed, such as a hydraulic motor, geared electric motor, and the like. Also, while hand operation of lever 40 is depicted, it is also to be understood that conventional mechanical, pneumatic, hydraulic, or electrical means may be employed, as well known in the art.

I claim:

1. A machine, of the type described, for fastening the end of a casing by crimping a fastener therearound, comprising, in combination, a base, a vertical mounting plate attachable to said base, said plate having, at its upper end, a throat into which a casing may be gathered, pressing means attached to the upper portion of said plate and serving to compress a casing in said throat prior to crimping of a fastener therearound, a slide arm mounted on said plate in limited laterally-movable relation, and having a laterally-directed slide channel therein and a side opening in said channel, designed to accept a fastener therein, said slide arm also having an end designed to project to near the bottom of said throat and to align and support a staple just prior to and during crimping thereof, a die attached to said plate adjacent the forward edge of said throat and having a die face in line with said channel and shaped to enable crimping of a fastener, the forward end of which is to be pressed thereagainst for crimping, spring means attached to said arm and said plate and designed to urge said plate toward said die, a driver designed to ride in said channel and having a forward end shaped to serve as a pushing die for a staple head disposable thereahead, a driving motor attached to said plate or base and having a plunger attached to and designed to move said driver in said channel, a feeder for feeding fasteners into said channel side opening, limited engaging means attached at its one end to said arm and at the other end to said plunger or driver, and designed to allow said arm end to move into fastener-aligning and-supporting position just prior to arrival there of said fastener, and to withdraw said arm end upon withdrawal of said plunger, and switching means for switching said motor for effecting pushing and withdrawal of said plunger.

2. A machine according to claim 1, which also includes a cover plate of the same general shape as the mounting plate, and attached thereto, a fastener chute serving as the fastener feeder, and having its bottom portion attached to said cover plate in line with said channel side opening, and an outlet opening in said cover plate designed to permit egress of fasteners from said chute to said channel side opening.

3. A machine according to claim 2 in which said pressing means is provided with a cutter, and an anvil mounted on said cover plate under said throat to serve as resting means for a casing end to be cut by said cutter.

4. A machine, according to claim 2, in which said slide arm has laterally-directed slots, and pins projecting out of said mounting plate and into said slots to serve as limiting means for movement of said arm.

5. A machine, according to claim 2, in which said arm carries a rearwardly projecting loop, and a pin projecting from said plunger or driver designed to ride in said loop and to serve, with said loop, as the limited engaging means on said arm.

References Cited

UNITED STATES PATENTS

| | | | |
|---|---|---|---|
| 2,866,975 | 1/1959 | Ine | 29—33.5 |
| 2,879,512 | 3/1959 | Tipper. | |
| 3,237,290 | 3/1966 | Frank | 29—243.57 |

THOMAS H. EAGER, *Primary Examiner.*